Aug. 1, 1933.   C. B. DANNENBERG ET AL   1,920,633
MACHINE FOR LAYING OFF SURFACE CONTOURS TO SCALE
Filed March 26, 1931   4 Sheets-Sheet 1
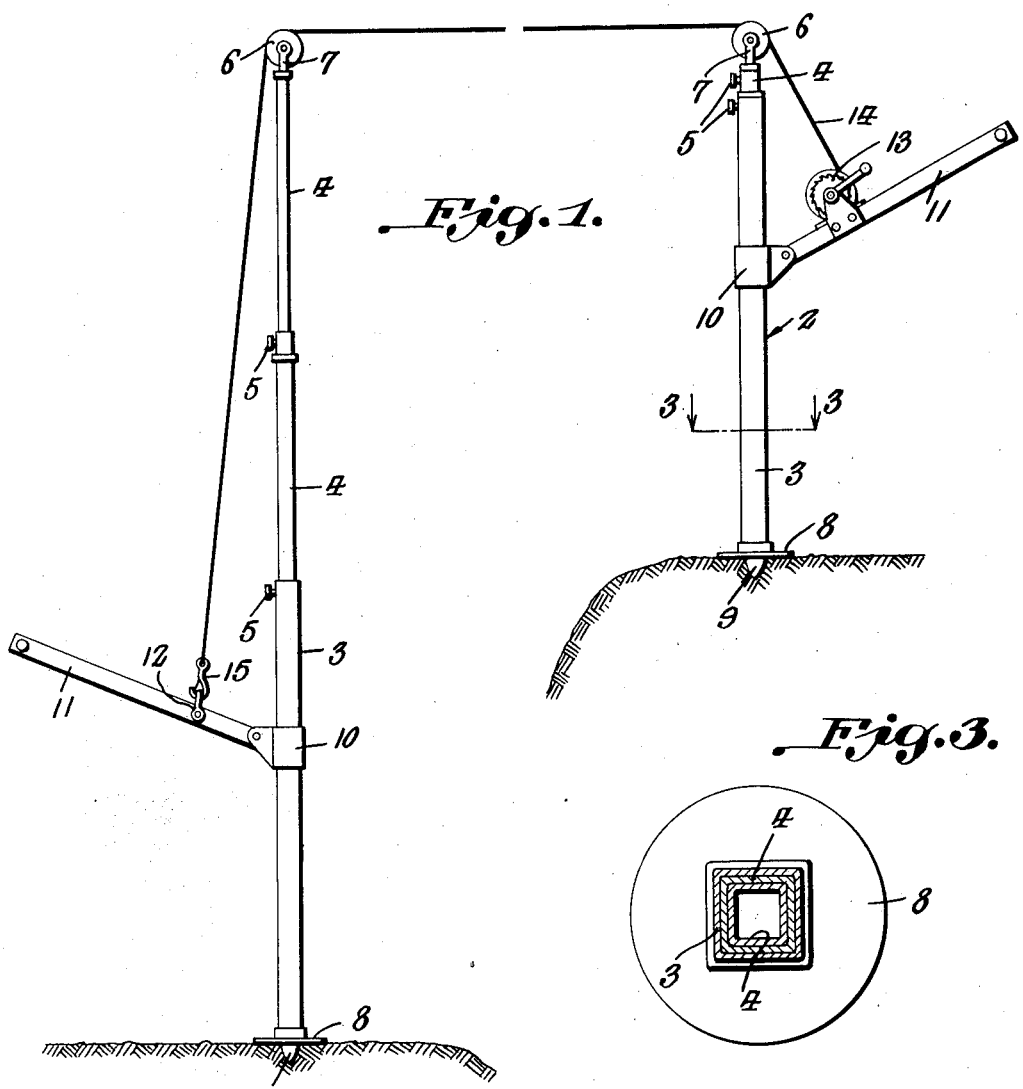
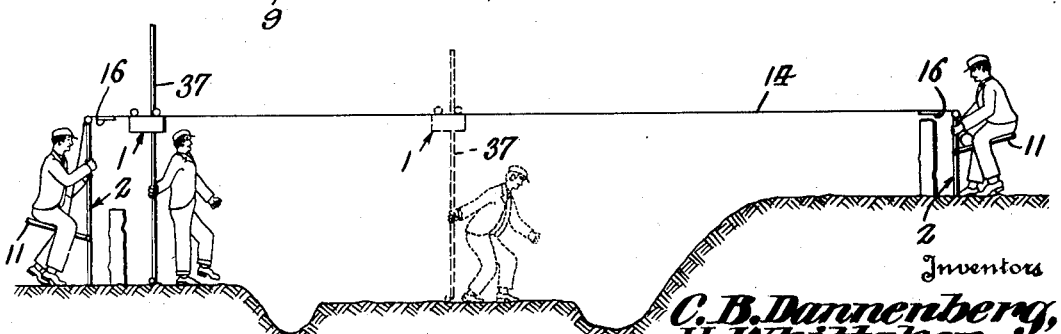

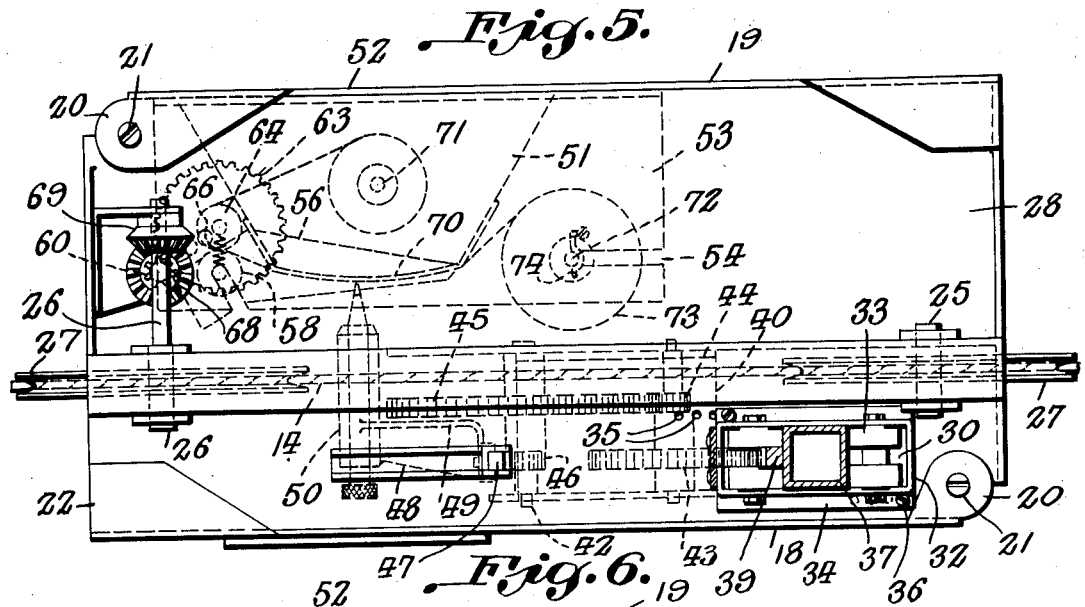
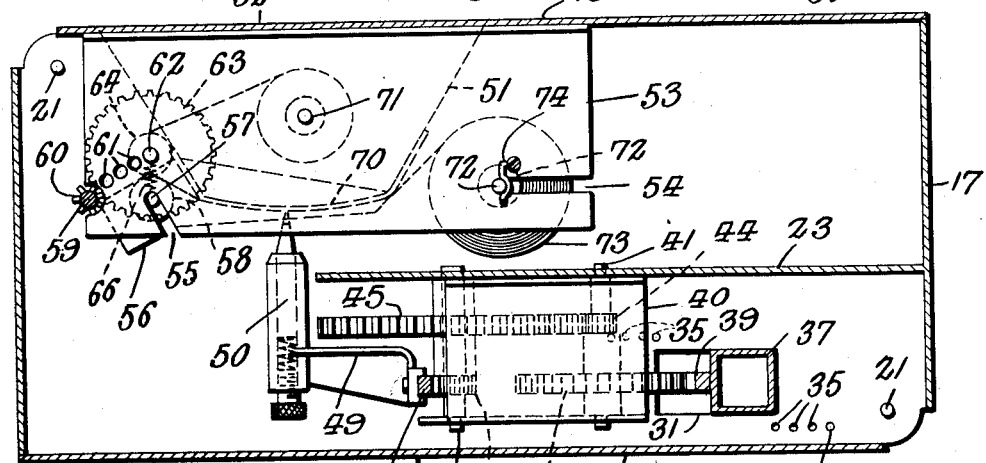
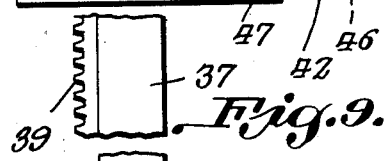
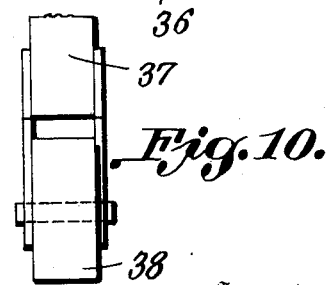

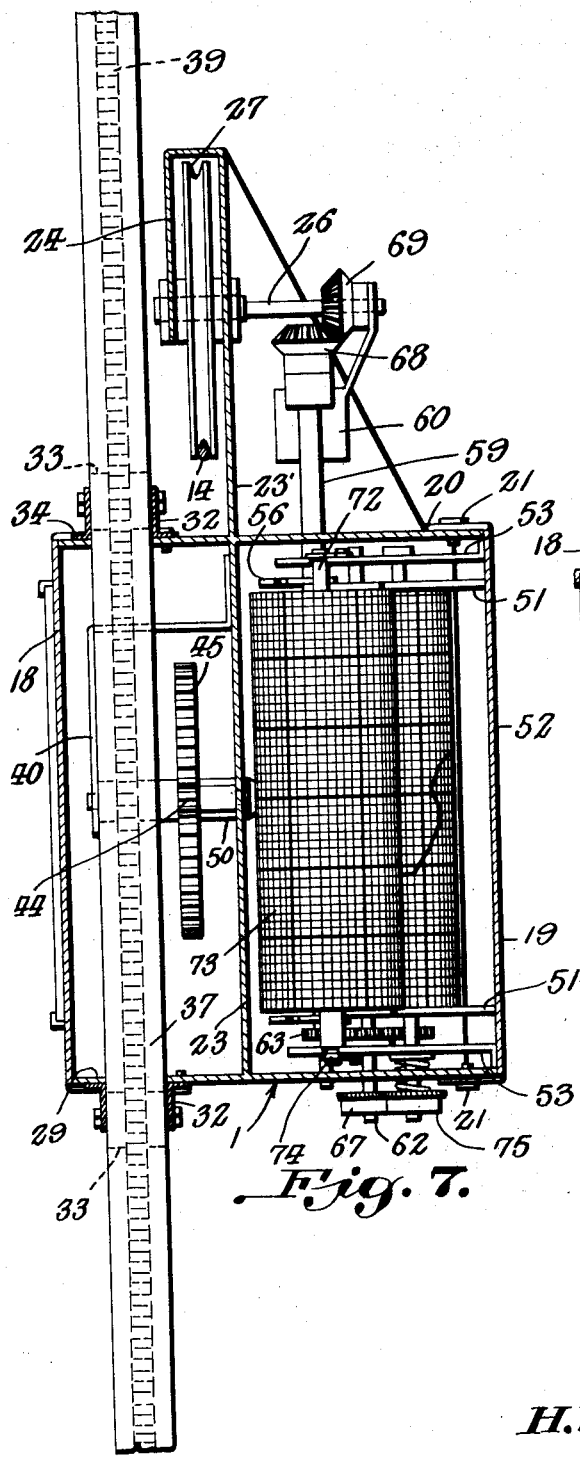

Patented Aug. 1, 1933

1,920,633

UNITED STATES PATENT OFFICE 1,920,633

MACHINE FOR LAYING OFF SURFACE CONTOURS TO SCALE

Charles B. Dannenberg and Harry Whittaker, Wilmington, Del.

Application March 26, 1931. Serial No. 525,496

6 Claims. (Cl. 234—8)

This invention relates to improvements in machines for laying out drawing contours and pertains particularly to a machine of this character devised especially for charting the cross-sectional contour of a roadway or any other piece of ground.

The primary object of the present invention is to provide a machine which will operate to produce quickly and accurately both sectional and longitudinal coutours of roads, and other surfaces, before and after improvement, to facilitate the making of accurate estimates of cuts and fills required in reconstruction.

Another object of the invention is to provide a machine which will lay off upon a chart the contour of the surface over which it is moved, to a prescribed scale.

Still another object of the invention is to provide a machine of the character above described in which certain substitutions of parts may be readily made to change the scale to which the contour obtained is drawn.

A still further object of the invention is to provide a machine of the above described character which is of extremely simple construction, but which will operate to accurately produce the results described.

Other objects and advantages of the present invention will become apparent as the description of the same proceeds, and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in elevation of the supporting structure for the charting device.

Figure 2 is a view illustrating the operation of the invention.

Figure 3 is a sectional view taken on the line 3—3 of Figure 1.

Figure 5 is a view in top plan of the casing and mechanism associated therewith.

Figure 6 is a horizontal sectional view taken on the line 6—6 of Figure 4.

Figure 7 is a vertical sectional view taken on the line 7—7 of Figure 4.

Figure 8 is a vertical sectional view taken on the line 8—8 of Figure 4.

Figure 9 is a view in side elevation of the lower end of the contour rod.

Figure 10 is a view in front elevation of the lower end of the contour rod.

Figure 4:
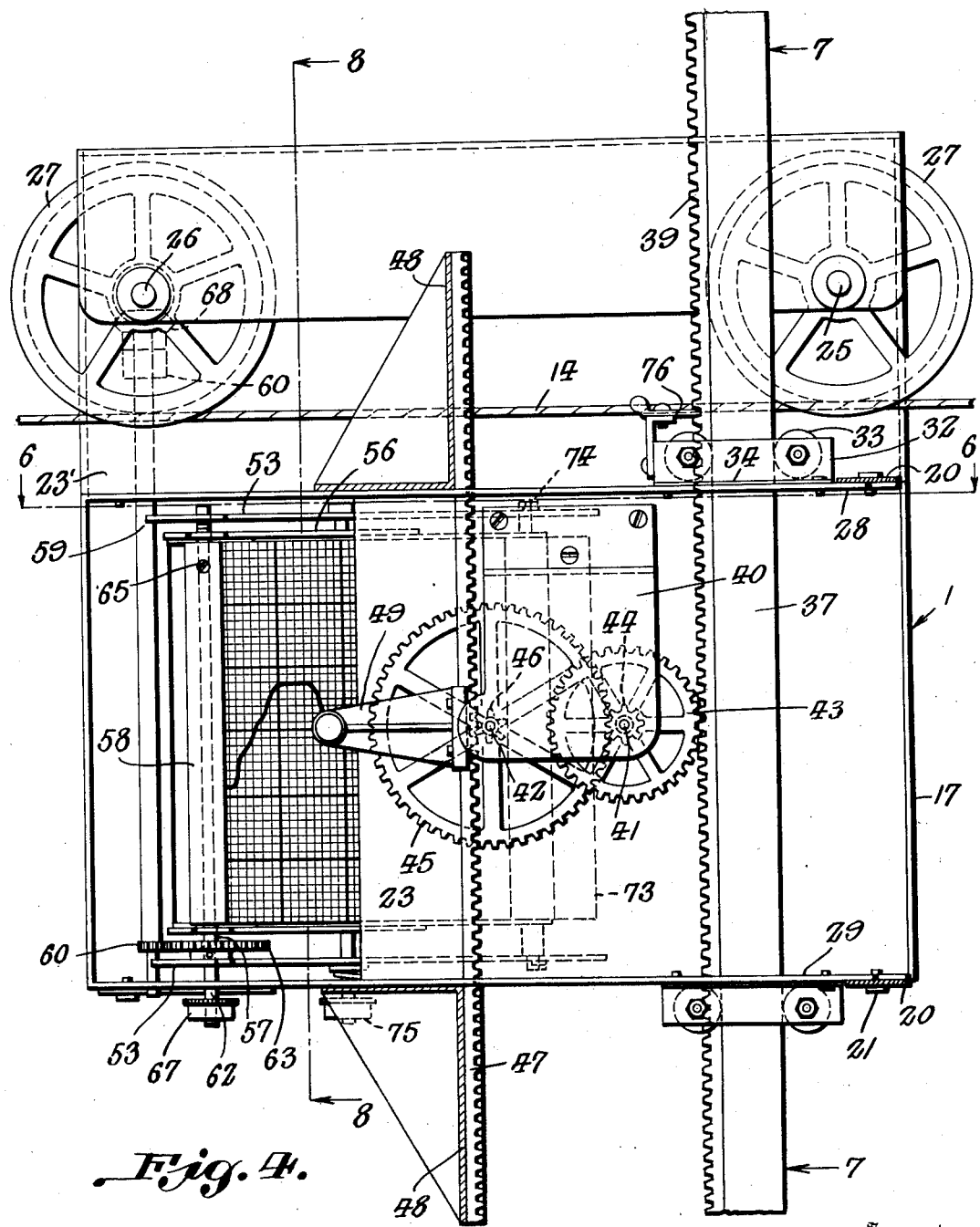
Figure 4 is a view of the charting mechanism looking into the front thereof, the front door having been removed.

Upon reference more particularly to the drawings, wherein like numerals of reference indicate corresponding parts throughout the several views, it will be seen that the present invention generally or broadly comprises two units, one of which constitutes the machine proper, and which is indicated generally by the numeral 1, while the other constitutes the carrying mechanism therefor when it is in operation, and which is indicated generally by the numeral 2.

The description will first be confined to the description of the carrying or supporting unit 2 for the machine 1. This unit consists of a pair of telescopic rods, each of which is indicated generally by the numeral 3. Each of these rods is made up of a series of sections 4 which telescope one into the other and which are preferably of rectangular cross-sectional design. The bottom and intermediate sections of the rods have, at their upper ends, the set screws 5 by means of which the various sections are secured in adjusted relation. The upper section of each of the rods carries a sheave 6 and a suitable bearing 7, as illustrated.

The bottom of the lower section of each rod has secured thereto a foot 8 and below this foot the rod is pointed, as indicated at 9, so that it may be easily made to penetrate the ground, the foot 8 of course serving to prevent too deep penetration when weight is applied to the rod.

The lower section or portion of each rod has pivotally secured thereto, by means of a collar 10, one end of a lever 11. One of the levers 11 has an eye 12 attached thereto while the other has mounted thereon a cable reel 13.

When the machine supporting unit 2 is set up for use, for example, as in the laying out of the cross-sectional contour of a road, the rods 3 are set up at opposite sides of the road in the manner indicated and a cable 14 of a suitable character, which is wound upon the reel 13, is fed from the reel across the pulleys 6 at the upper ends of the rods and connected by any suitable means as, for example, by the snap hook 15, with the eye 12 upon the other lever. The necessary adjustments are made to the rods 3 to arrange the portion of the cable 14, between the pulleys 6, perfectly horizontal or level, suitable hanging levels 16 being suspended from the cable adjacent each rod for this purpose, as illustrated.

After setting up the supporting structure or unit for the machine the same is mounted upon the horizontal portion of the cable and operated, as will be hereinafter described.

The unit 1 comprises a rectangular casing or housing 17 of sheet metal. The front and rear sides of the housing are closed by the doors 18 and 19 respectively.

Each of these door bodies has at one end, at its upper and lower edges, the ears 20 which overlie the adjacent top and bottom walls of the housing to which they are pivotally connected by pins 21. The opposite or free end of each door has a flange 22 at its top and bottom edges which engages over the adjacent wall to support the door and hold it, through frictional contact with the walls of the housing, in closed position.

The housing 17 has a vertical partition wall 23 extending longitudinally therethrough from one end toward but terminating short of the other end and this partition wall extends through the top of the housing and further extends the full length thereof above the top, as illustrated. This exterior extension of the partition wall, which is indicated by the numeral 23', is formed at its upper edge to provide the depending spaced parallel shield portion 24 between which, and the portion 23', are mounted the shafts 25 and 26, each of which shafts carries a sheave wheel 27.

Adjacent one end of the housing 17 the top and bottom walls 28 and 29 respectively have the vertically aligned openings 30 and 31 formed therethrough. Mounted upon each of the walls 28 and 29 and surrounding the openings 30 and 31 therethrough is an elongated rectangular bearing frame 32 in which are mounted two pairs of fiber roller bearings 33, the pairs being spaced longitudinally of the frame in which they are mounted. These frames 32 have projecting from each lower longitudinal edge a flange 34 and in the wall adjacent each flange there is formed a longitudinally extending series of apertures 35 in which the securing screws 36, which pass through the flanges, may be selectively engaged.

Passing vertically through the housing 17, through the openings 30 and 31 and between the pairs of bearings carried in the frames 32, is a contour rod 37 upon the lower end of which is mounted, upon suitable anti-friction bearings, a tracer wheel 38. One longitudinal edge of the rod 37 is formed to provide a rack 39.

Adjacent the rod 37, upon the side upon which the rack 39 is formed, is a bracket plate 40 which is mounted upon and in spaced relation to the partition 23. Suspended between this bracket plate 40 and the partition plate 23 is a pair of shafts, one of which is indicated by the numeral 41 while the other is indicated by the numeral 42, and upon the shaft 41 there is mounted a rack gear 43 and a pinion 44 while upon the other shaft, or the shaft 42, is a spur gear 45 which meshes with the pinion 44 and a rack pinion 46. The rack gear 43 engages the teeth of the rack 39 so that as the contour rod 37 is shifted vertically it will be readily seen that rotary motion will be transmitted to the pinion 44 and through this to the spur gear 45 and to the rack pinion 46.

The shafts 41 and 42 are removable so that the gears and their associate pinions may be changed as desired to alter the scale of the contour chart formed by the machine, as will be hereinafter more fully explained.

Extending vertically before and having toothed engagement with the rack pinion 46 is a rack 47. The top and bottom walls 28 and 29, of the housing, are provided with suitable openings to permit the ends of this rack to extend to the exterior of the housing and upon these top and bottom walls, upon the side of the rack opposite the side upon which the rack pinion 46 is located, are mounted guide and guard plates 48 against the faces of which the rack 47 moves and which serve to protect the rack against injury.

Within the housing the rack has secured thereto an arm 49, upon the end of which is mounted a pencil or "stylo" pen 50. If necessary, this arm may be so positioned that if a pen is used the point thereof will be directed downwardly slightly so that the ink will readily flow therefrom upon the chart with which it is in contact.

The rear or back door 19 of the housing has cut therefrom the plates 51 which are bent inwardly to be disposed at right angles to the inner face thereof, as shown in Figure 8. These plates are so formed from the body of the door that, after they are bent inwardly to the horizontal positions shown, one thereof will be adjacent the top of the casing while the other will be disposed in parallel relation thereto adjacent the lower part or bottom of the casing. By forming the plates 51 in this manner a portion of the rear door has formed therein the window or opening 52. While this is the preferred method of providing the plates 51, it is, of course, to be understood that they may be formed separately and attached to the inner face of the door if desired.

Above and below the plates 51, and spaced therefrom, are the larger rectangular plates 53. These plates 53 are slightly elongated in the direction of the length of the housing and each has a slot formed longitudinally therein from the end edge nearest the contour rod 37, which might be referred to as the rear edge, as indicated at 54. Adjacent the opposite or forward end edge there is formed, in the inner longitudinal edge of each of the plates 53, a slot 55 and each of the plates 51 carries a bearing arm 56 for the reception of the trunnion ends 57 of a roll 58 which is disposed vertically between the plates 53.

Extending vertically through the housing, from the bottom 29 thereof, to and through the top wall 28 is a shaft 59, the upper end of which is supported in a suitable bearing 60 which is carried by the partition extension 23', while the lower end has a bearing in the bottom wall 29 of the housing. This shaft is disposed across the forward edges of the plates 53 and near its lower end it carries a pinion 60.

The plates 53 are provided, adjacent the shaft 59, with a series of bearings 61 in which may be selectively mounted, adjacent its ends, the shaft 62. This shaft has mounted thereon, near its lower end, an interchangeable gear 63 and between the planes of the plates 51 it carries a roll 64 which operates as a feed roll for the chart paper upon which the chart is laid out, as will be hereinafter described. This roll 64 is removably held upon the shaft 62 by the set screw 65, as it is necessary that the shaft 62 be withdrawn when changing the gear 63 in making adjustments in the mechanism for altering the scale of the chart drawn thereby. The roll 58 acts as a pressure roll to keep the chart paper pressed firmly against the feed roll 64 and a suitable spring, such as is indicated by the numeral 66, may be employed for maintaining this contact between the rolls firm. The lower end of the shaft 62 extends through a slot formed in the bottom of the housing and carries thereon the head 67 by means of which rotary motion may be given to the shaft manually when necessary.

The upper end of the shaft 59 carries a bevel gear 68 which meshes with a similar gear 69 which is carried upon the horizontally disposed shaft 26 which supports the adjacent sheave wheel.

The inner edges of the smaller horizontal plates 51 are slightly arcuate in contour, as shown, and are connected by a vertical plate 70. Rotatably mounted between these small plates 51, behind the vertical plate 70, is a spring held take-up roll 71 and between the plates 53 is disposed a shaft 72 which extends through a roll of cross-section paper 73, the ends of this shaft being located in the slots 54 and held in position in the inner ends thereof by spring latches 74. The shaft of the take-up roll 71 extends downwardly through the underlying plate 53 and through a slot in the bottom wall 29 of the housing, terminating upon the exterior thereof in the head 75.

In preparing the machine for use, the free end of the cross-section paper from the roll 73 is drawn from the rear side across the plate 70, which may be referred to as the paper table, passed between the rolls 58 and 64 and about the roll 64 to the spring tensioned take-up roll 71 to which it is attached.

As will be seen the mechanism mounted between the plates 51 and the plates 53 which includes the paper roll carrying shaft 72, the roll carried thereby, the pressure and feed rolls 58 and 64 respectively and the spring tensioned take-up shaft 71 are all carried by the rear door 19 of the structure. Thus, when the door is closed, the portion of the cross-section paper laying across the table 70 will move in and contact with the marking end of the pencil or pen 50.

In operation, after the unit 2 is set up, the unit 1 is suspended from the cable 14 by mounting the sheave wheels 27 thereon in the manner illustrated. By then moving the unit 1 along the cable 14 from one end to the other, while the wheel 38 of the contour rod rests upon the ground, the contour rod will be shifted vertically in accordance with the formation of the ground surface over which the wheel 38 moves.

This will, of course, impart corresponding rotary movement to the gear 43 which is in mesh with the rack 39 and to the gear and pinion 45 and 46 and cause the vertical reciprocation of the rack 47 which is in mesh with the pinion 46. The marker 50 will thus be made to move vertically over the face of the paper with which it is in contact. At the same time that the marker 50 is being moved vertically, in the manner described, rotary motion is imparted to the feed roll 64 to draw the paper across the table 70 at a regulated speed. This rotation of the feed roll 64 is obtained through the medium of the sheave wheel mounted upon the shaft 26 which, by reason of its contact with the stationary cable 14, rotates and turns the bevel gears 68 and 69 and thus transmits the necessary motion through the pinion 60 to the gear 63.

By the use of gears properly proportioned in the mechanism the sectional and longitudinal contours of roads or other surfaces may be laid out on the paper passing across the table 70, to any scale desired. As an example, in order to lay out the contour of a road surface to a scale of one-fifth of an inch to the foot for the vertical scale or cross-section of the road, then the tracer rod must move vertically at the ratio of sixty to one for the rack 47 which carries the marker. The gears 43 and 45 therefore are provided with sixty and ninety-six teeth respectively, while the pinions 44 and 46 are provided respectively with eight and twelve teeth. In order to give the same scale for the longitudinal contour the paper passing beneath the marker must move one-fifth of an inch for each foot traveled by the unit 1 and this result is obtained by employing sheave wheels having a tread circumference of exactly one foot with the other elements operated thereby accordingly proportioned as follows.

The bevel or miter gears are of 24-pitch with one inch pitch diameter and for each revolution of the sheave mounted upon the shaft 26 these gears turn the shaft 59 one revolution.

Since the miter gears turn the shaft one revolution for each foot of travel of the sheave, the 12-tooth pinion 61, which is employed, also makes one revolution and thus turns the 120-tooth spur gear 63, which is in mesh therewith, one-tenth of a revolution. The friction roller or feed roll 64 has an exact circumference of two inches and is thus turned one-tenth of its circumference or one-fifth of an inch, thus moving the paper the same distance.

It will be readily seen from the foregoing that by substituting the gears shown and described, with others of properly proportioned circumference, the contour outlined on the paper, of the ground surface over which the tracer wheel 38 passes, may be laid off to scales of one-quarter, one-third or one-half inch to the foot as desired.

In order to prevent movement of the contour rod 37, when the unit 1 is removed from the supporting cable 14, a latch finger 76 is oscillatably mounted upon a suitable part of the mechanism, as shown, so that it may be readily swung into engagement with the rack 39 of the contour rod, as desired, to hold the same against movement.

The front door 18 of the housing is provided with a glass covered window 77 through which the operation of the marking pen or pencil upon the cross-section paper may be viewed without the necessity of opening the front door of the housing.

The paper take-up roll 71 is resiliently held against movement by the spring member 78 which surrounds the lower end of the shaft on which this roll is mounted, as shown in Figure 8. The lower end of this spring 78 bears against the head 75 while the upper end thereof bears against a washer 79 which surrounds the shaft and which bears against the underface of the lower plate 53. It will thus be seen that as the paper passes over the friction roll 64 it will fold up behind the table 70 and may be taken up manually as desired. It will also be seen that by permitting the paper to fold up in this manner before taking it up on the roll 71 it may be readily drawn through the opening in the rear door 19 for inspection.

It will be readily seen that when the gears are changed, for the purpose of altering the scale of the chart made by the machine, the position of the contour rod will have to be changed accordingly. Therefore, the necessary provision has been made for this by making the fiber rolls in contact with the contour rod adjustable on the body of the housing in the manner shown and described.

From the foregoing description it will be readily seen that by the use of the machine embodying the present invention the surface contour of a section of ground may be readily charted to an exact scale, the length of the ground area charted being limited only by the ability of the users of the machine to maintain the section of cable, upon which the unit 1 is mounted, at the proper degree of tautness necessary for the movement of the unit in a straight line above the ground.

Having thus described the invention, what is claimed is:

1. A machine for laying off road and other surface contours to scale, comprising an elongated substantially rigid member supported for vertical reciprocatory movement and having means upon one end to facilitate its movement in vertical position over the surface to be plotted, a marking element, mechanism coupling said elongated member with said marking element for translating movement at a reduced ratio from the member to the marking element, a chart engaged by and moved relative to the marking element in a path at right angles to the direction of movement thereof, and means for supporting the structure for movement in a horizontal path over the surface being charted.

2. A machine of the character described for laying off the horizontal and vertical contour of a road or other surface to scale, comprising a casing, a rod extending through said casing and supported for vertical movement and adapted to have its lower end moved over the surface to be charted, a chart sheet in the casing supported for movement in a horizontal path, a marker having contact with said sheet and supported for movement in a path at right angles to the path followed by the sheet, gear mechanism operated by said rod and connected with the marker for moving the latter a distance bearing a definite relation to the distance moved by the rod, and means for supporting said casing for movement in a horizontal path over the surface to be charted.

3. A machine of the character described, comprising a casing, a rod disposed vertically and extending through said casing and having a wheel upon the other end thereof, an elongated member extending vertically through the casing and supported for longitudinal movement, a marker element carried by said member, mechanism connecting said rod with said elongated member whereby movement of the rod will be transmitted on a reduced scale to the member, means for supporting a paper for movement against said marker in a path at right angles to the path of movement of the marker, and means for supporting the casing for movement in the horizontal path.

4. A machine for laying off surface contours upon a chart, comprising a body, means for supporting the body for travel in a horizontal path over the surface to be charted, means carried by the body for attaching it to the supporting means for movement thereon, a chart mounted on the body for movement at a speed proportional to the movement of the body on the supporting means, a marker mounted on the body for movement against the chart in a path at right angles to the direction of movement of the chart, and means shiftably carried by the body for movement over and in contact with the ground and connected with said marker for effecting the movement thereof.

5. A machine for laying off surface contours upon a chart, comprising a body, means for supporting the body for travel in a horizontal path over the surface to be charted, means coupling the body with and for travel upon the said supporting means, a chart table carried by the body, a chart overlying the table for movement thereover, a marker mounted for movement over the chart and table transversely of the path of travel of the chart, a ground engaging element connected with the body for reciprocal movement, and coupling means between the ground engaging element and the marker for transferring motion to the marker.

6. In a machine for charting surface contours, a casing having a wall, means for supporting said casing at an elevation over the surface to be charted for movement horizontally over such surface, a chart table carried by said wall and disposed within the casing, said table being designed to have a chart paper moved thereover at a speed proportional to the movement of the casing over the surface being charted, an elongated member mounted for reciprocal movement in a casing in a path at right angles to the path of movement of the chart paper, a marker carried by said elongated member for contact with a chart paper passing over the table, a second elongated member extending through and reciprocable in said casing in a path parallel to the first elongated member, said second member being designed to have one end pass over and follow the contour of the surface to be charted, and means for transferring the reciprocal motion of the second mentioned elongated member to the first elongated member.

CHARLES B. DANNENBERG.
HARRY WHITTAKER.